US006386532B1

(12) United States Patent
Donovan et al.

(10) Patent No.: US 6,386,532 B1
(45) Date of Patent: May 14, 2002

(54) CLAMP SQUEEZE APPARATUS AND METHOD

(75) Inventors: Gary L. Donovan, Marysville; Karl J. Schaefer, Everett, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/804,089

(22) Filed: Mar. 12, 2001

(51) Int. Cl.$^7$ .................................................. B23Q 3/08
(52) U.S. Cl. ................................. 269/25; 269/3; 269/6; 269/254 CS
(58) Field of Search .......................... 269/25, 257, 237, 269/21, 20, 254 CS, 6, 3, 268

(56) References Cited

U.S. PATENT DOCUMENTS 1,075,064 A * 10/1913 Prime .......................... 269/25
1,271,365 A * 7/1918 Reynolds ..................... 269/25
4,635,638 A * 1/1987 Weintraub et al. ............ 269/25
5,125,296 A 6/1992 Nelson et al.
5,312,094 A * 5/1994 Zera ............................ 269/21
6,164,162 A 12/2000 Furundzic

* cited by examiner

*Primary Examiner*—Joseph J. Hail, III
*Assistant Examiner*—Lee Wilson
(74) *Attorney, Agent, or Firm*—Alston & Bird LLP

(57) ABSTRACT

A clamp squeeze apparatus and method for squeezing a pair of handles of a hand clamp to open a jaw of the hand clamp, is provided. The clamp squeeze apparatus includes a body, a handle, a pair of squeeze jaws and a fluid pressure device. The handle is connected to the body. The pair of squeeze jaws are slidably mounted on the body and slidable in a closing direction and an opening direction. The closing direction advances the jaws together and the opening direction retracts the jaws apart. The fluid pressure device is connected to a fluid pressure supply and is operable to slide the pair of squeeze jaws in the closing direction so as to squeeze a pair of handles of the hand clamp and open the jaws of the hand clamp. The clamp squeeze apparatus and method eliminates the risk of hand and wrist injuries by automating clamping processes.

18 Claims, 2 Drawing Sheets

CLAMP SQUEEZE APPARATUS AND METHOD

FIELD OF THE INVENTION

The present invention is related to the field of clamping processes and, more particularly, to automated clamp opening devices for opening and deploying of hand operated spring clamps.

BACKGROUND OF THE INVENTION

Many manufacturing processes use spring clamps that must be deployed manually in various operations, such as the gluing together of the parts of an assembly. For instance, during construction of aircraft interiors in the aerospace industry it is not uncommon to need fifteen or thirty hand clamps spaced every couple of inches on an assembly to hold the assembly together during a gluing operation. Once the glue is spread, all of the spring clamps must be placed on the assembly within a couple of minutes due to the short time period required for the glue to dry. A large percentage of workers do not have the hand strength or stamina to install fifteen or thirty hand clamps in rapid succession and with satisfactory results. Clamp removal must also be done quickly and is almost as rigorous a task as clamp placement.

The rigors of the clamping task pose a risk for cumulative trauma injuries to the hand and wrist. Tendinitis of the hand, wrist or forearm may occur, which is an inflammation of the tendons and tendon sheaths. Carpal tunnel syndrome may also occur, which is an inflammation of the flexor tendons of the fingers which pass through a channel on the palmer side of the wrist formed by the carpal bones and the transverse carpal ligament. These flexor tendons become inflamed with repetitive overuse and place pressure on the nearby median nerve. Pressure on the median nerve causes numbness and/or pain in the lower arm. Carpal tunnel syndrome may even result in permanent dysfunction of the hand and wrist.

Despite the drawbacks of manual deployment of hand clamps, there are a lack of alternatives that have the same flexibility and effectiveness as manual clamping processes. Lighter-duty spring clamps are easier to open, but often do not have sufficient force to secure assemblies together during gluing. Dedicated jigs can be used, but are complicated and expensive because the jigs must typically be customized to the different assembly shapes and sizes.

Therefore, it would be advantageous to have a method and apparatus for opening spring clamps while avoiding possible trauma to the hand and wrist. In addition, it would be advantageous to have a method and apparatus for opening spring clamps that does not require modification of the spring clamps or the manufacture of customized clamping. It would also be advantageous if the clamps could still be quickly deployed in time-sensitive operations, such as the gluing together of assemblies.

SUMMARY OF THE INVENTION

The present invention includes a clamp squeeze apparatus for squeezing a pair of handles of a hand clamp to open a jaw of the hand clamp. The clamp squeeze apparatus includes a pair of fluid pressure driven squeeze jaws for holding and squeezing the handles of a variety of hand clamps. The pair of squeeze jaws are driven by fluid pressure so that operation of the clamp squeeze apparatus does not require significant manual exertion.

In one embodiment, the clamp squeeze apparatus includes a body, a handle, a pair of squeeze jaws and a fluid pressure device. The handle is connected to the body. The pair of squeeze jaws are slidably mounted on the body and slidable in a closing direction and an opening direction. The closing direction advances the jaws together and the opening direction retracts the jaws apart. The fluid pressure device is connected to a fluid pressure supply and is operable to slide the pair of squeeze jaws in the closing direction so as to squeeze a pair of handles of the hand clamp and open the jaws of the hand clamp.

A first one of the pair of squeeze jaws may include a large pocket and a small pocket. The first one of the pair of squeeze jaws is adjustable to move the large and small pockets alternatively into a position facing a second one of said pair of squeeze jaws so that the handles of large and small hand clamps, respectively, fit between the pair of squeeze jaws.

In yet another embodiment, the clamp body includes a slide channel along which a first one of the pair ofjaws is slidable in the opening and closing directions. The fluid pressure device may include a chain and a cylinder. The chain has a first end connected to the first one of the pair ofjaws and a second end connected to the cylinder. The cylinder is actuated by the fluid pressure supply. The chain is slidable along a second channel defined by the body in response to actuation of the cylinder so that the first one of the pair ofjaws slides in the closing direction. In another aspect, a spring urges the pair ofjaws to slide in the opening direction.

The present invention has several advantages. The risk of cumulative hand and wrist trauma from manual deployment of hand clamps is eliminated as the clamp squeeze apparatus can be operated with the pull of a trigger. The squeeze jaws are easily adjustable to allow for the opening of a range of clamp sizes. Thus, the hand clamps do not have to be modified or custom manufactured to be opened by the clamp squeeze apparatus. The hand clamps can also be quickly inserted and removed from the squeeze jaws for rapid deployment during time-sensitive operations, such as the gluing of assemblies.

BRIEF DESCRIPTION OF THE DRAWINGS

Figure 1:
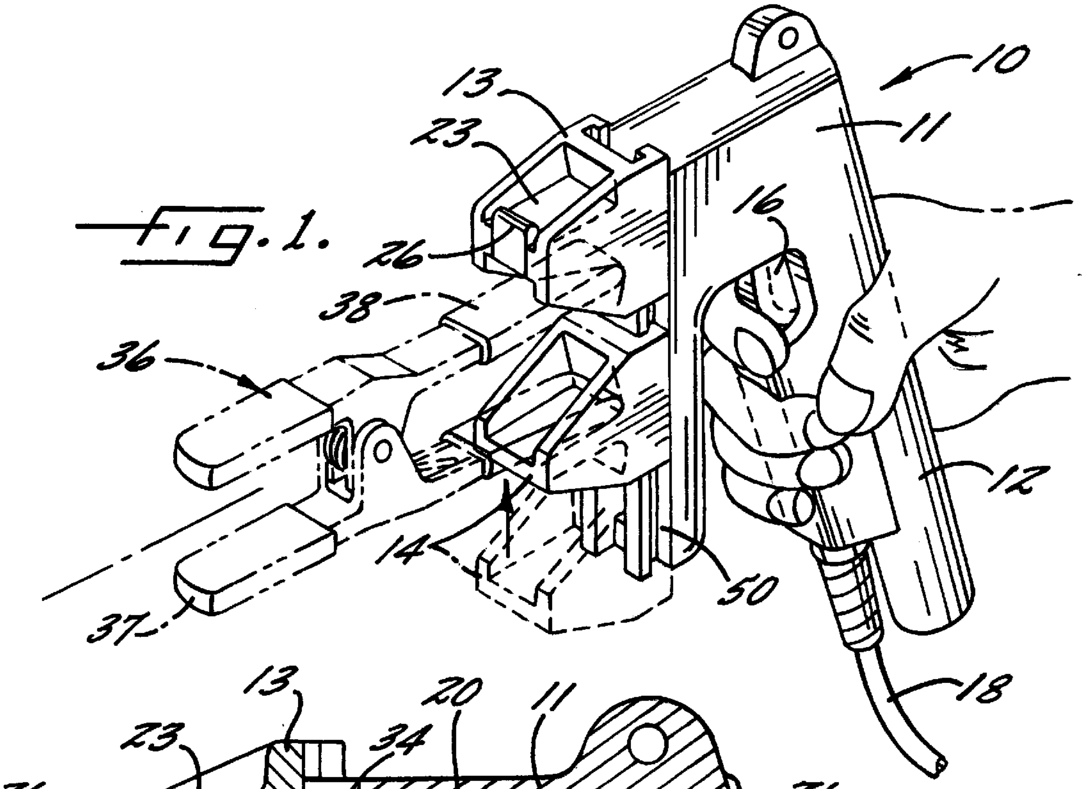
Figure 2:
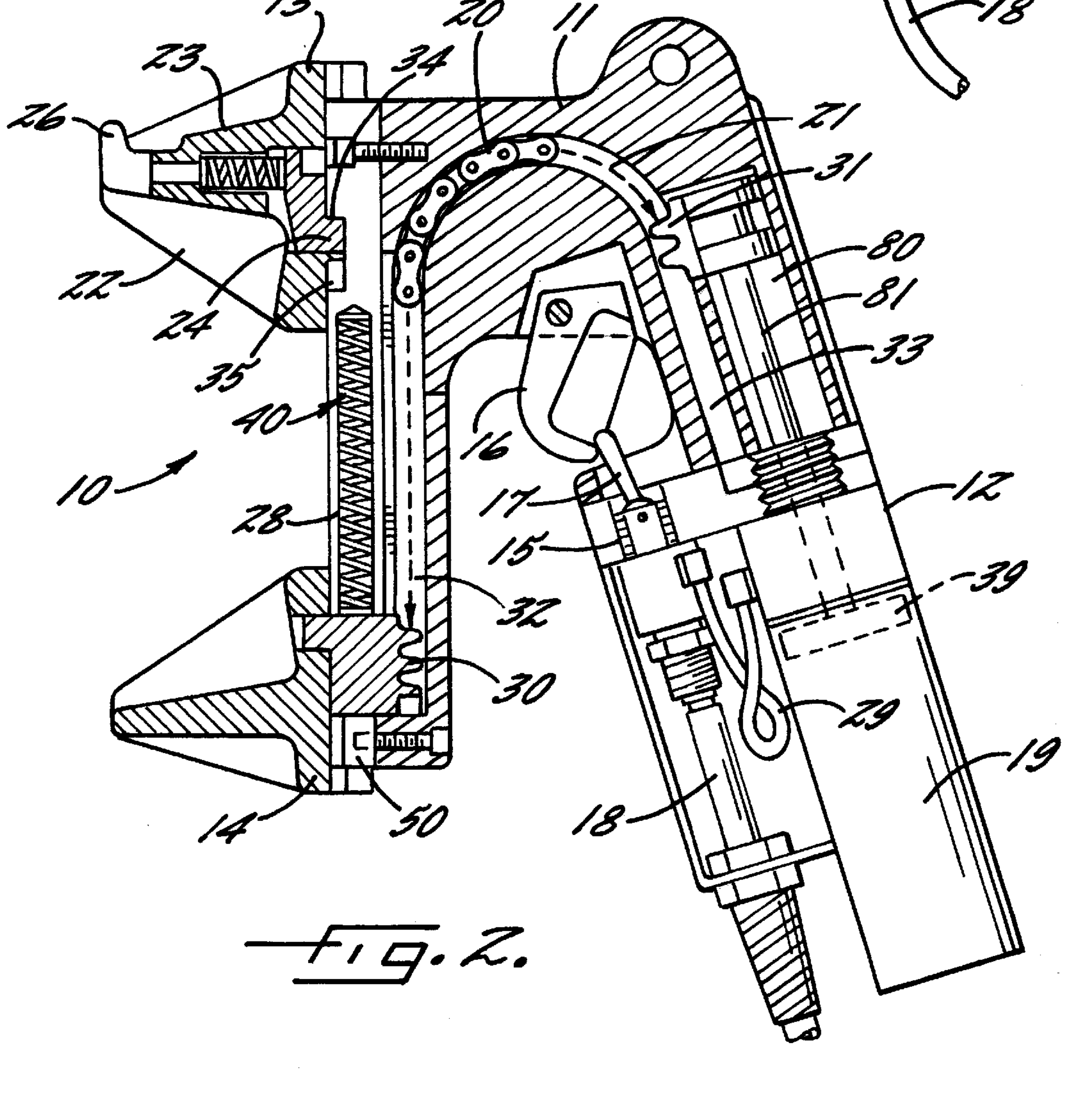
Figure 3:
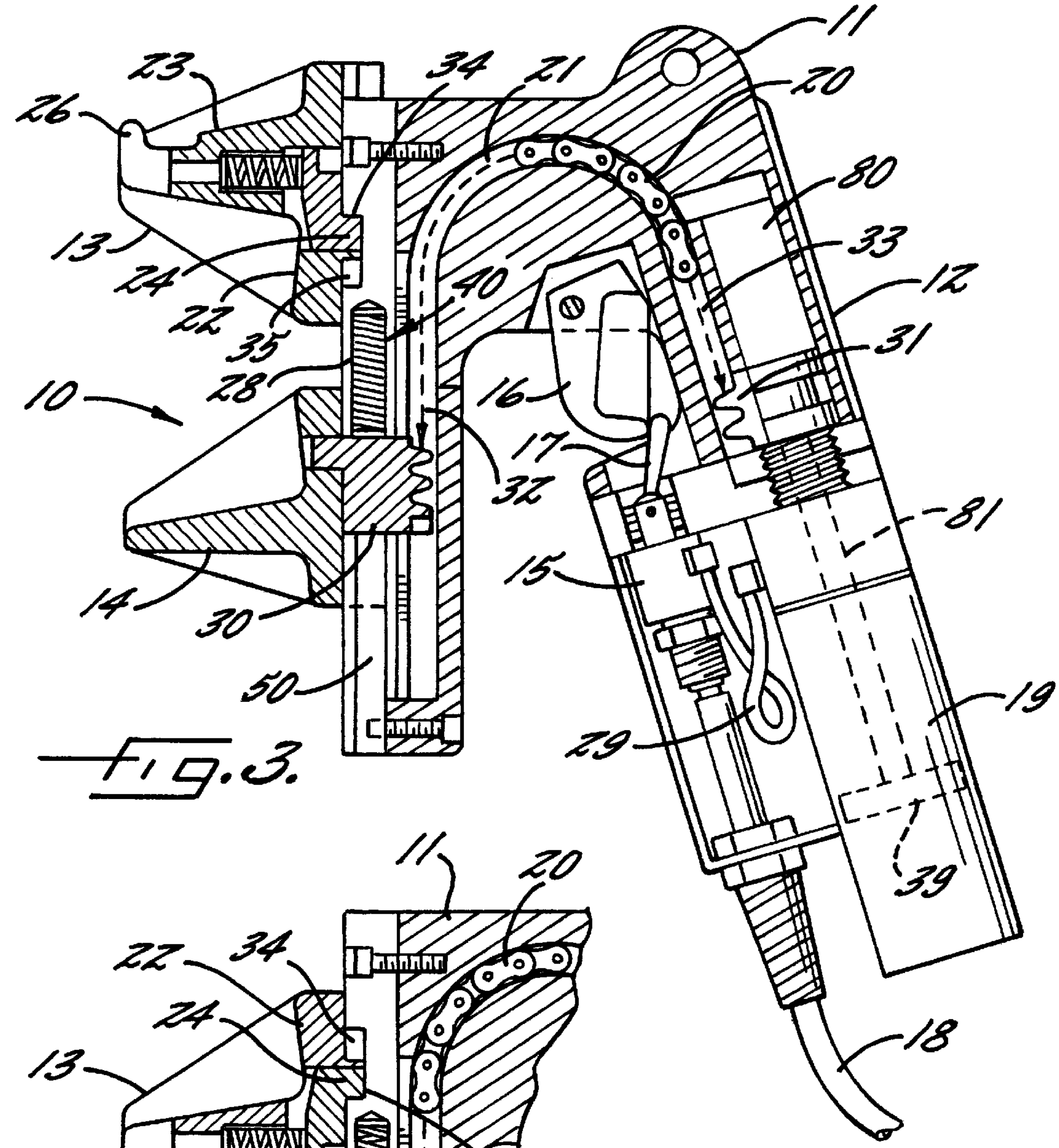
Figure 4:
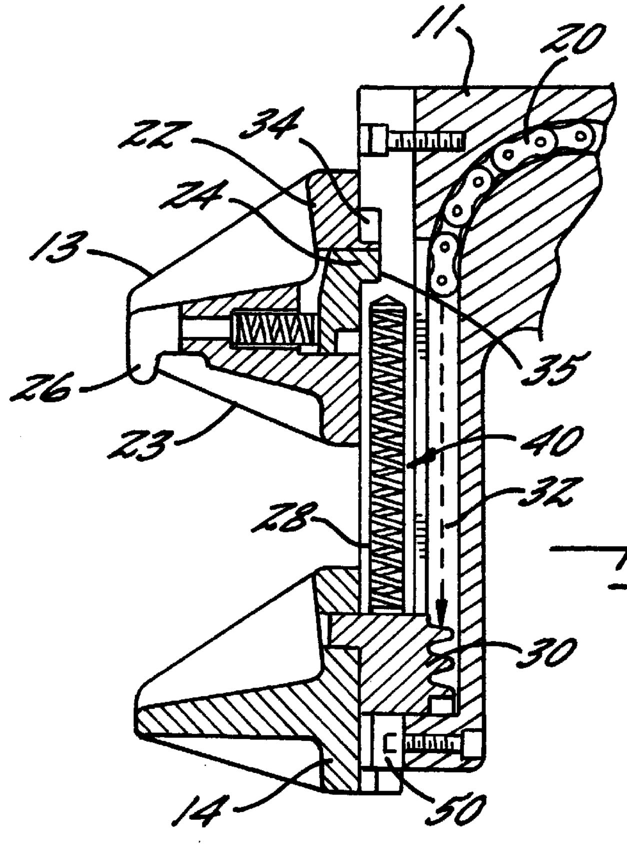

Having thus described the invention in general terms, reference will now be made to the accompanying drawings, which are not necessarily drawn to scale, and wherein:

FIG. 1 is a perspective view of one embodiment of a clamp squeeze apparatus of the present invention having a pair of squeeze jaws in a closed position to hold open a jaw of a conventional hand clamp;

FIG. 2 is a partial cut-away view of the clamp squeeze apparatus of FIG. 1 with the pair of squeeze jaws in an open position;

FIG. 3 is a partial cut-away view of the clamp squeeze apparatus of FIG. 1 with the pair of squeeze jaws in a closed position; and FIG. 4 is a partial cut-away view of the clamp squeeze apparatus of FIG. 1 with one of the squeeze jaws configured to open hand clamps having small handles.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A clamp squeeze apparatus 10 of the present invention is shown in FIGS. 1 through 4. The clamp squeeze apparatus includes a body 11, a handle 12, a fixed squeeze jaw 13, a moving squeeze jaw 14 and a cylinder 19. The handle 12 is attached to one side of the body 11 and the squeeze jaws 13, 14 are spaced from the handle 12 on an opposing side of the body 11. The moving squeeze jaw 14 attached to the chain 20 and is slidably mounted to a slide channel 50 defined by the body 11. The chain extends through a second channel 21 defined by the body 11 and the other end of the chain is attached to a chain pawl 31 which is in turn attached through a piston rod 81 to a piston 39 of the cylinder 19. The cylinder itself is contained within the body 11 and forms part of the handle 12.

During operation, a pair of handles 38 of a hand clamp 36 are inserted between the squeeze jaws 13, 14 when the squeeze jaws are open, as shown in FIG. 2. A worker grips the handle 12 in one hand and pulls a trigger 16 on the handle which opens a pneumatic valve 15 and supplies air pressure to the cylinder 19. Supplying air pressure to the cylinder causes the piston 39 to move from the position shown in FIG. 2 to the position shown in FIG. 3. Movement of the piston 39 is coupled with the movement of the moving squeeze jaw 14 by the chain 20. As the piston of the cylinder 19 is driven open by air pressure, the chain 20 drives the moving squeeze jaw 14 closer to the fixed jaw 13 in a closing direction. This movement squeezes closed the pair of handles 38 of the hand clamp 36 and opens a pair ofjaws 37 of the hand clamp allowing the hand clamp to be deployed in a clamping process, as shown in FIG. 1. Release of the trigger 16 shuts off the air supply and releases air within the cylinder 19 allowing a slide compression spring 28 to drive the moving squeeze jaw 14 in an opposite, opening direction away from the fixed jaw 13.

The pneumatic cylinder 19 is preferably housed partially in, and forming part of, the handle 12 and partially in the body 11 of the clamp squeeze apparatus 10 to minimize the bulk of the apparatus. The pneumatic cylinder 19 is supplied air from an internal supply line 29 that is in turn supplied with air from the fluid pressure supply line 18. The air supply to the internal supply line 29 is controlled by the pneumatic valve 15 which is a three-way valve that is opened and closed by a toggle switch 17. Movement of the toggle switch is controlled by movement of the trigger 16. Pulling the trigger flips the toggle switch 17 and opens the pneumatic valve 15 releasing the pneumatic pressure through the internal supply line 29 and into a chamber of the cylinder 19 behind the piston 39. Release of the trigger 16 returns the toggle switch 17 to its original position, which cuts off the air pressure from the supply line 29 and releases pressure from the cylinder 19 to the outside atmosphere.

The movement of the moving jaw 14 could also be powered by a range of fluid pressure devices, such as hydraulic cylinders or servo-hydraulic cylinders. In addition, the present invention should not be considered limited to the use of a cylinder to transfer fluid pressure into mechanical power. In other embodiments, the cylinder 19 could be replaced with other fluid pressure devices, such as a rotor or a turbine.

The pneumatic cylinder 19 is sized to provide a comfortable grip diameter as well as sufficient force to open most commonly used hand clamps. Some examples of the hand clamps that can be opened using the present invention include, but are not limited to, Stanley Model 83-262 requiring 28 pounds of force to open, Stanley Model 83-263 requiring up to 48 pounds of force to open, Brink & Cotton No. 1 and Wilton Model 634 requiring from 18 to 22 pounds to open. The cylinder is selected to provide a force equal to approximately 90% of the available air line pressure.

The clamp squeeze apparatus 10 is essentially a pressure sensitive device i.e., the amount of pressure in the cylinder 19, not the air flow into the cylinder, controls the force developed by the clamp squeeze. However, high air flow may result in an excessive jaw closing speed. Jaw closing speed is regulated by the slide compression spring 28 and the relatively small internal diameter of the internal air pressure supply line 29. The small diameter of the internal air pressure supply line 29 reduces the flow-rate of the air supplied from the supply line 18. The slide compression spring 28 is housed in a receptacle 40 defined by the body 11. The slide compression spring 28 has a fixed end and an opposing end, the opposing end is in contact with the moving squeeze jaw 14. As the moving squeeze jaw is moved in the closing direction toward the fixed jaw 13, the force in the compression spring 28 increases, urging the moving squeeze jaw 14 in the opposite, opening direction. The counterbalance of compression spring 28 force and air pressure force serves to decelerate the movement of the moving squeeze jaw 14. Note also, that in the absence of air pressure, the compression spring 28 will bias the jaws 13, 14 into a normally open position to readily receive another hand clamp 36.

The majority of the hand clamps in use, such as the Stanley Model 83-262, require about 1.5 inches of stroke in the cylinder 19. The clamp squeeze apparatus 10 can also be fitted with a 2 inch stroke cylinder 19 and wider jaws to accommodate larger clamps, such as the Stanley Model 83-263. In an alternative embodiment, additional space savings could be had if the pneumatic valve 15 and the cylinder 19 were incorporated in a single unit.

Movement of the cylinder piston 39 is coupled with movement of the moving jaw 14 via the chain 20 which rides in the second channel 21. The second channel 21 of the illustrated embodiment has an inverted U-shape with a first arm 32 in proximity to the piston of the cylinder 19 and a second arm 33 in proximity to the moving jaw 14. The moving jaw has a pawl 30 that slides in the first arm 32 of the second channel 21 and the piston 39 of the cylinder 19 has a pawl 31 that slides in the second arm 33 of the second channel 21. The chain 20 connects the two pawls 30, 31 so that air pressure on the piston of the cylinder 19 is transmitted as tension along the chain that urges the moving jaw 14 along the slide channel 50 in the direction of the fixed jaw 13. The chain 20 and piston 39 can be connected in other ways so as to couple of movement of the piston to the chain.

The pawl 31 is similar to a piston, sliding in a cavity 80 and has teeth machined on one side for attachment of the chain. The cavity 80 is machined into the body 11 and the handle 12 to provide space for pawl 31 which is threaded onto the end of the rod of the cylinder 39. The chain 20 is not pulled along the axis of the cylinder 39, but rather on an offset defined by one half of the width of the pawl 31 to decrease the top-to-bottom length of the apparatus 10. Alternatively, the chain 20 could be attached in a different manner, such as directly to the end of the rod of the cylinder 39.

The fixed jaw 13 has a pair of pockets, a small pocket 23 and a large pocket 22 that can be positioned to allow opening of smaller or larger clamps, respectively. As shown in FIG. 2, the fixed jaw 13 is positioned so that the large pocket 22 is facing the moving jaw 14, so as to readily receive larger pairs of clamp handles. As shown in FIG. 4, the fixed jaw 13 is repositioned more closely to the moving jaw 14 and with the small pocket 23 facing the moving jaw, so as to easily receive smaller pairs of clamp handles. The fixed jaw 13 can be alternated between the two positions by gripping a finger pull 26 which retracts a spring-biased locator pin 24 out of either a top locator hole 34 or bottom locator hole 35, depending upon the initial configuration. Retracting the locator pin 24 allows the worker to slide the fixed jaw 13 off of the body 11 and reposition the fixed jaw 13. With the locator pin 24 retracted, the fixed jaw 13 can be slid off of the body 11, along the channel 50. The fixed jaw can then be flipped over to position the opposing pocket to face the moving jaw 14 and slid back on the channel 50 until the locator pin 24 seats into the desired locator hole 34 or 35. The clamp squeeze 10 is configured for larger clamps when the locator pin 24 is in the top locator hole 34, as shown in FIGS. 1, 2 and 3, and for smaller clamps when in the bottom locator hole 35, as shown in FIG. 4. The pockets 22, 23 can be constructed in a range of sizes and shapes to match up with various clamp handle designs.

The slide channel 50 is defined by the body 11, more specifically, is a machined aluminum channel that is attached to the rest of the body which is comprised of plastic. However, the body 11 and channel 50 could also be integrally constructed of a range of different materials.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A clamp squeeze apparatus for squeezing a pair of handles of a hand clamp to open a jaw of the hand clamp, said clamp squeeze apparatus powered by a fluid pressure supply and comprising:

a body;

a handle connected to the body;

a pair of squeeze jaws, each squeeze jaw defining a respective first pocket for receiving one handle of the hand clamp, wherein at least one squeeze jaw is slidably mounted on the body and slidable in a closing direction and an opening direction, said closing direction advancing the squeeze jaws together and the opening direction retracting the squeeze jaws apart; and a fluid pressure device connected to the fluid pressure supply and operable to slide the pair of squeeze jaws in the closing direction so as to squeeze the pair of handles and open the jaw of the hand clamp.

2. The clamp squeeze apparatus of claim 1, wherein a first one of said pair of squeeze jaws defines a second pocket opposing the first pocket for receiving a handle of the hand clamp, wherein the second pocket is dimensionally smaller than the first pocket, said first one of the pair of squeeze jaws being adjustable to move the first and second pockets alternatively into a position facing a second one of said pair of squeeze jaws so that large and small hand clamps, respectively, fit between the pair of squeeze jaws.

3. The clamp squeeze apparatus of claim 2, wherein the first one of the pair of squeeze jaws can alternatively be fixed to the body in a first position and a second position to alternatively position the first pocket and second pocket toward the second one of the pair of squeeze jaws, respectively, and the second one of the pair of squeeze jaws is slidable toward the first one of the pair of squeeze jaws in the closing direction and slidable away from the first one of the pair of squeeze jaws in the opening direction.

4. The clamp squeeze apparatus of claim 1, wherein said clamp body includes a slide channel along which a first one of the pair of squeeze jaws is slidable in the opening and closing directions.

5. The clamp squeeze apparatus of claim 4, wherein said fluid pressure device further includes a chain and a cylinder, said chain having a first end connected to the first one of the pair of squeeze jaws and a second end connected to the cylinder, said cylinder actuated by the fluid pressure supply and said chain slidable along a second channel defined by the body in response to actuation of the cylinder so that the first one of the pair of squeeze jaws slides in the closing direction.

6. The clamp squeeze apparatus of claim 5, further comprising a spring urging the pair of squeeze jaws to slide in the opening direction.

7. The clamp squeeze apparatus of claim 5, wherein said first one of the pair of jaws includes a pawl connecting the first one of the pair of squeeze jaws to the first end of the chain and the piston includes a second pawl connecting the piston to the second end of the chain.

8. The clamp squeeze apparatus of claim 1, wherein the fluid pressure device is housed partially in the body and partially in the handle.

9. The clamp squeeze apparatus of claim 1, further comprising the handle being spaced from the first and second squeeze jaws to allow insertion of a hand therebetween.

10. A method of opening a hand clamp using a clamp squeeze apparatus, comprising:

gripping a handle of the clamp squeeze apparatus with a hand;

inserting a pair of handles of the hand clamp into a pair of squeeze jaws of the clamp squeeze apparatus;

activating a fluid pressure device connected to a fluid pressure supply; and sliding the pair of squeeze jaws in a closing direction using the fluid pressure device and squeezing the pair of handles of the hand clamp in the squeeze jaws to open a jaw of the hand clamp.

11. The method of opening the hand clamp of claim 10, further comprising adjusting one of the pair of squeeze jaws so that a first pocket defined by the one of the pair of squeeze jaws is facing the other one of the pair of squeeze jaws.

12. The method of opening the hand clamp of claim 11, wherein adjusting one of the squeeze jaws includes moving the one of the pair of squeeze jaws further away from the other one of the pair of squeeze jaws.

13. The method of opening the hand clamp of claim 11, further comprising the step of adjusting the one of the pair of squeeze jaws so that a second pocket defined by the one of the pair of squeeze jaws and dimensionally smaller than the first pocket is facing the other one of the pair of squeeze jaws.

14. The method of opening the hand clamp of claim 13, wherein said adjusting step includes moving the one of the pair of squeeze jaws closer to the other one of the pair of squeeze jaws.

15. The method of opening the hand clamp of claim 10, wherein said sliding step includes sliding one of the pair of squeeze jaws along a slide channel defined by a body of the clamp.

16. The method of opening the hand clamp of claim 15, wherein said activating the fluid pressure device includes introducing the fluid pressure supply to a cylinder of the fluid pressure device to move a piston of the cylinder and advancing a chain, connected to the cylinder and the one of the pair of squeeze jaws, along a second channel defined by the body so that the one of the pair of squeeze jaws is moved along the slide channel in the closing direction.

17. The method of opening the hand clamp of claim 10, further comprising the step of removing the squeeze jaws from the handles of the hand clamp by urging the pair of squeeze jaws to slide in the opening direction using a spring.

18. The method of claim 10, wherein said gripping step includes inserting the hand between the pair of squeeze jaws and the handle of the clamp squeeze apparatus.

* * * * *